(12) United States Patent
Comlekoglu

(10) Patent No.: US 7,809,955 B2
(45) Date of Patent: Oct. 5, 2010

(54) TRUSTABLE COMMUNITIES FOR A COMPUTER SYSTEM

(75) Inventor: Fatih Comlekoglu, Great Falls, VA (US)

(73) Assignee: Blue Ridge Networks, Inc., Chantilly, VA (US)

( * ) Notice: Subject to any disclaimer, the term of this patent is extended or adjusted under 35 U.S.C. 154(b) by 1023 days.

(21) Appl. No.: 11/581,861

(22) Filed: Oct. 17, 2006

(65) Prior Publication Data

US 2008/0092235 A1    Apr. 17, 2008

(51) Int. Cl.
*G06F 11/30* (2006.01)

(52) U.S. Cl. .......................................... 713/187; 726/26
(58) Field of Classification Search .................. 713/187
See application file for complete search history.

(56) References Cited

U.S. PATENT DOCUMENTS

| | | | |
|---|---|---|---|
| 5,276,735 A | 1/1994 | Boebert et al. | 713/167 |
| 6,826,684 B1 | 11/2004 | Fink et al. | 713/160 |
| 7,043,633 B1 | 5/2006 | Fink et al. | 713/162 |
| 7,133,845 B1 | 11/2006 | Ginter et al. | 705/51 |
| 7,269,702 B2 * | 9/2007 | Willman et al. | 711/163 |
| 7,353,531 B2 * | 4/2008 | Brown et al. | 726/1 |
| 7,457,951 B1 * | 11/2008 | Proudler et al. | 713/164 |
| 7,634,807 B2 * | 12/2009 | Yan et al. | 726/22 |
| 2003/0126468 A1 | 7/2003 | Markham | 713/201 |
| 2004/0111639 A1 | 6/2004 | Schwartz et al. | 713/201 |
| 2006/0031672 A1 | 2/2006 | Soltis et al. | 713/164 |
| 2006/0101399 A1 | 5/2006 | Murayama et al. | 717/120 |
| 2006/0136705 A1 * | 6/2006 | Kaimal et al. | 713/2 |
| 2006/0218635 A1 * | 9/2006 | Kramer et al. | 726/22 |
| 2007/0143269 A1 * | 6/2007 | Ando et al. | 707/3 |
| 2007/0204078 A1 | 8/2007 | Boccon-Gibod et al. | 710/54 |
| 2008/0072287 A1 * | 3/2008 | Movva et al. | 726/2 |
| 2008/0077801 A1 * | 3/2008 | Ekberg | 713/187 |

FOREIGN PATENT DOCUMENTS

| | | |
|---|---|---|
| JP | 2005129066 | 3/2005 |
| JP | 2006048687 | 2/2006 |

OTHER PUBLICATIONS

Suryanarayana et al.; "Architectural Support for Trust Models in Decentralized Applications", May 20-28, 2006, ICSE, pp. 52-61.*

* cited by examiner

*Primary Examiner*—Matthew B Smithers
(74) *Attorney, Agent, or Firm*—Scot A. Reader

(57) ABSTRACT

A trustable community for a computer system includes multiple software components that have security interdependence. A trustable community attempts to stop malware from compromising one software component within the community by conditioning operation of the software component upon a determination of present trustworthiness of itself and other software components within the community. Present trustworthiness may be determined through hash checks and application of community rules defining conditions under which software components are trustworthy.

25 Claims, 5 Drawing Sheets

TRUSTABLE COMMUNITIES FOR A COMPUTER SYSTEM

BACKGROUND OF THE INVENTION

The present invention relates to computer security, and more particularly to enhancing security of computer systems through consideration of the security interdependence of software components.

Software components that run on computer systems, such as applications, operating systems, sharable libraries and system drivers, often have undetected flaws that can be exploited by malicious computer programs that are received over the Internet or other communication network. Such malicious programs, sometimes called malware, include Trojans, viruses, worms, spyware and the like. Known security systems for computer systems attempt to combat malware by trying to prevent it from compromising any part of the computer system. Such security systems include anti-virus detection and removal systems, system behavior analysis systems and packet inspection systems. Additionally, some computer operating systems require integrity verification of individual software components before allowing them to execute on the computer system. Such integrity verification schemes usually involve a hash check of individual software components.

While these security features can significantly improve computer system security, they generally neglect the security interdependence of software components. It is often the case that when one software component is non-operational or its integrity has been violated, another software component that has security dependency on the inactive or compromised component is rendered more vulnerable. For example, an application on a computer node may become more vulnerable if a firewall application that protects the software system of the computer node is inactive. Or an application on a computer node may become more vulnerable if a shared library utilized by the application has been compromised. In these situations and others, computer system security could be significantly enhanced by taking into account security dependencies of software components when determining operational privileges.

SUMMARY OF THE INVENTION

The present invention, in a basic feature, provides trustable communities for computer systems. A trustable community comprises multiple software components that have security interdependence. Such a community attempts to stop malware from compromising one software component within the community by conditioning operation of the software component upon a determination of present trustworthiness of itself and other software components within the community. Present trustworthiness may be determined by performing hash checks or applying community rules defining conditions of trustworthiness, for example. Software components within a trustable community may reside on a single computer node or may be distributed across multiple computer nodes.

In one aspect of the invention, therefore, a trustable community for a computer system comprises a first software component and a second software component wherein operation of the first software component is conditioned at least in part on a determination of present trustworthiness of the second software component.

In another aspect of the invention, a trustable community for a computer system comprises a first software component, a second software component and a software agent, wherein the software agent monitors the second software component and conditions operation of the first software component at least in part on a determination of present trustworthiness of the second software component.

In some embodiments, the determination comprises performing a hash check.

In some embodiments, the determination comprises applying community rules defining conditions of trustworthiness for the second software component.

In some embodiments, the determination is made in response to loading of the first software component in preparation for launch.

In some embodiments, the determination is made in response to termination of execution of the second software component.

In some embodiments, operation of the first software component is further conditioned on a determination of present trustworthiness of the first software component.

In some embodiments, information respecting prevention of launch of the first software component is logged.

In some embodiments, the community further comprises a hardware component adapted to cryptographically sign the logged information.

In some embodiments, the logged information is transmitted to a centralized log facility.

These and other features of the present invention will be better understood by reference to the detailed description of the preferred embodiment read in conjunction with the drawings briefly described below. Of course, the scope of the invention is defined by the appended claims.

DETAILED DESCRIPTION OF A PREFERRED EMBODIMENT

Figure 1:
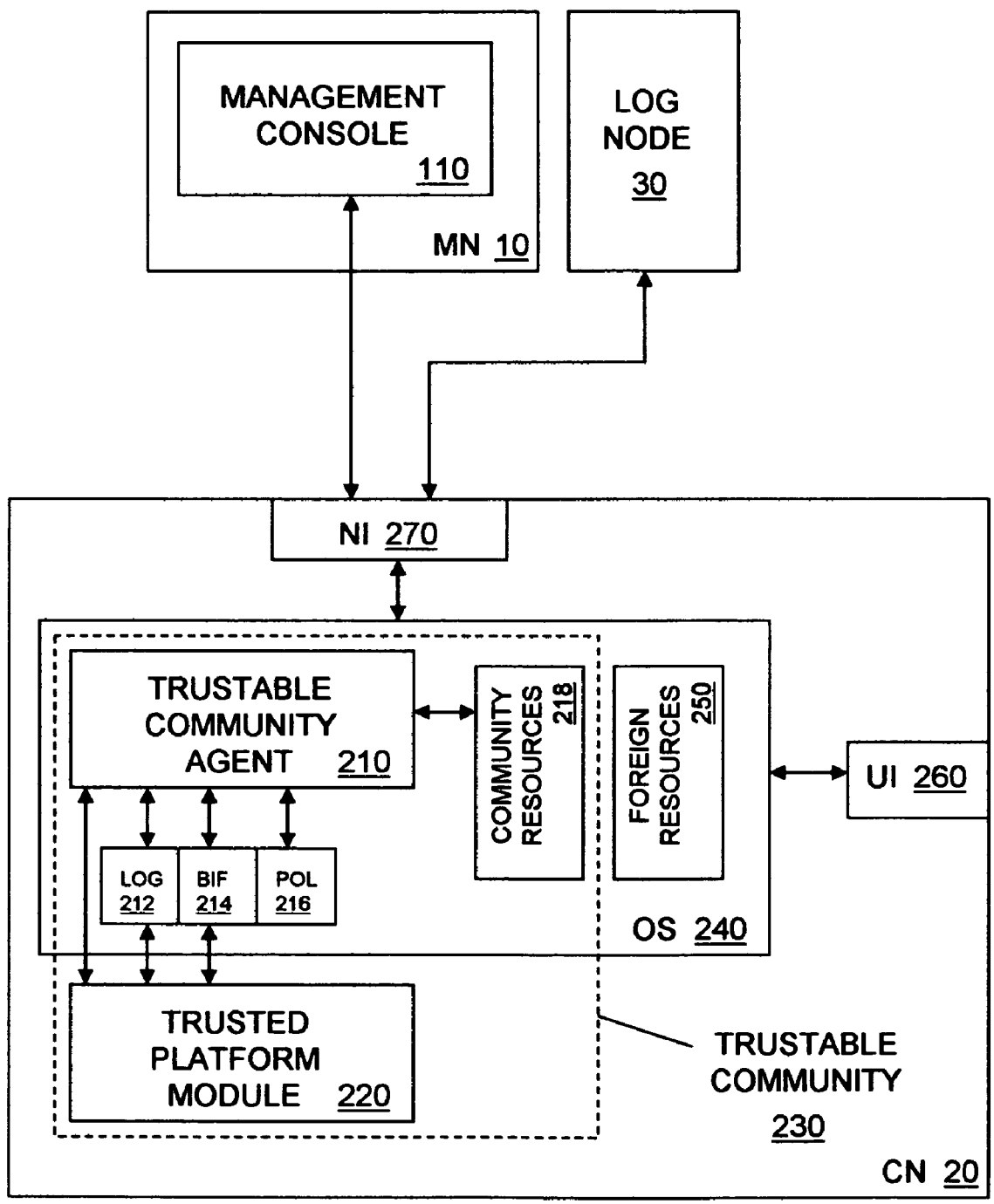
FIG. 1 shows a computer network including a computer node having a trustable community in one embodiment of the invention.

In FIG. 1, a computer network including a computer node 20 having a trustable community 230 is shown in one embodiment of the invention. In the illustrated embodiment, computer node 20 is a personal computer, although in other embodiments a computer node having a trustable community may be a personal data assistant, an Internet Protocol (IP) or cellular phone, a server computer, a router or a switch, for example. Moreover, a trustable community, in some embodiments, may include software components distributed across multiple computer nodes.

In the illustrated embodiment, computer node 20 is communicatively coupled via network interface 270 with other computer nodes, including a management node 10 and a log consolidation node 30. In other embodiments the management services provided by management node 10 and the log consolidation services provided by log consolidation node 30 may be co-located on a single network node. Communication between nodes 10, 30, on the one hand, and node 20, on the other, may be achieved using various data communication protocols, such as TCP/IP, and may be conducted via zero or more intermediate network nodes, such as routers and switches.

Management node 10 has a management console 110 thereon. Management console 110 is a software system adopted to communicate securely with a trustable community agent 210 on computer node 20 as will be explained in more detail.

Computer node 20 includes an operating system 240 communicatively coupled between a user interface 260 and network interface 270. Operating system 240 is a software system that executes and manages software components as well as networking and user interfacing for computer node 20. Operating system 240 executes and manages software components within and outside community 230 as well as interactions between such components. Software components executed and managed by operating system 240 are depicted in FIG. 1 as part of operating system 240 for the sake of clarity, although it will be appreciated that some of these elements may be merely executed and managed by operating system 240. In some embodiments, operating system 240 is a Microsoft Windows-based operating system, such as Windows 2000, Windows XP or Windows Vista, and runs on an Intel-based general purpose microprocessor such as Intel Pentium II, Pentium III, Pentium 4 or Celeron.

Community 230 includes a logical group of software components executed and managed by operating system 240 as well as at least one hardware component. The software components within community 230 include management components that manage community 230 and managed components that are managed by the management components. The management components include trustable community agent 210, log file 212, binding information file 214 and policy schema 216. The managed components include community resources 218. The hardware elements within community 230 include trusted platform module (TPM) 220. Naturally, in some embodiments, a computer node 20 may have multiple trustable communities operating under control of a single trustable community agent. Moreover, in some embodiments, a software component may belong to multiple trustable communities.

Community resources 218 are identified in policy schema 216. Community resources 218 may include, for example, application code; sharable libraries, such as dynamically linkable libraries (DLL) in Windows environments or shared libraries in UNIX and Linux environments; and system drivers. Community resources 218, generally speaking, have strong security interdependence. That is, when one of community resources 218 is non-operational or its integrity has been breached other community resources 218 are, generally speaking, rendered substantially more vulnerable to being compromised by malware.

TPM 220 is a microcontroller within community 230 that interfaces with community agent 210 but is neither managed nor executed by operating system 240. TPM 220 uses a TPM private key to facilitate management of community resources 218 and detect violations of the integrity of community 230. In some embodiments, TPM 220 is an application specific integrated circuit (ASIC) compliant with Trusted Computing Group Trusted Platform Module Specification Version 1.2 and installed on computer node 20 by the manufacturer of computer node 20. It will be appreciated that hardware-based management and execution of TPM 220 limits the vulnerability of TPM 220 to malware attacks and improves overall security of community 230.

Foreign resources 250 include software components outside community 230. Foreign resources 250 include, for example, applications that run on operating system 240 and that are not managed by community agent 210. Community resources 218, generally speaking, do not have a strong security dependence on foreign resources 250.

Secure operation of community 230 is dependent upon secure installation on computer node 20 of a trustable community software package. Management console 110, under direction of an administrator, prepares the community software package for secure installation. In some embodiments, the community software package includes community agent 210 and policy schema 216. In embodiments where there is more than one trustable community the software package may include a policy schema for each community. Management console 110 maintains a master copy of agent 210. The administrator uses management console 110 to generate a policy schema 216 appropriate for community 230. Management console 110 generates a hash value of agent 210 and cryptographically signs the agent hash value using the management console private key. Management console 110 also generates a hash value of policy schema 216 and cryptographically signs the schema hash value using the management console private key. Management console 110 further generates a hash value of the entire software package and cryptographically signs the package hash value using the management console private key. In some embodiments, policy schema 216 is also cryptographically signed by the administrator who defined the policy schema 216 using the administrator private key. Once all of the signatures have been applied, management console 110 downloads the signed software package to computer node 20. It will be appreciated that the signed hash values may be used to detect alteration or corruption of the community software package or elements thereof prior to installation on computer node 20, whether by malware or otherwise.

Figure 2:
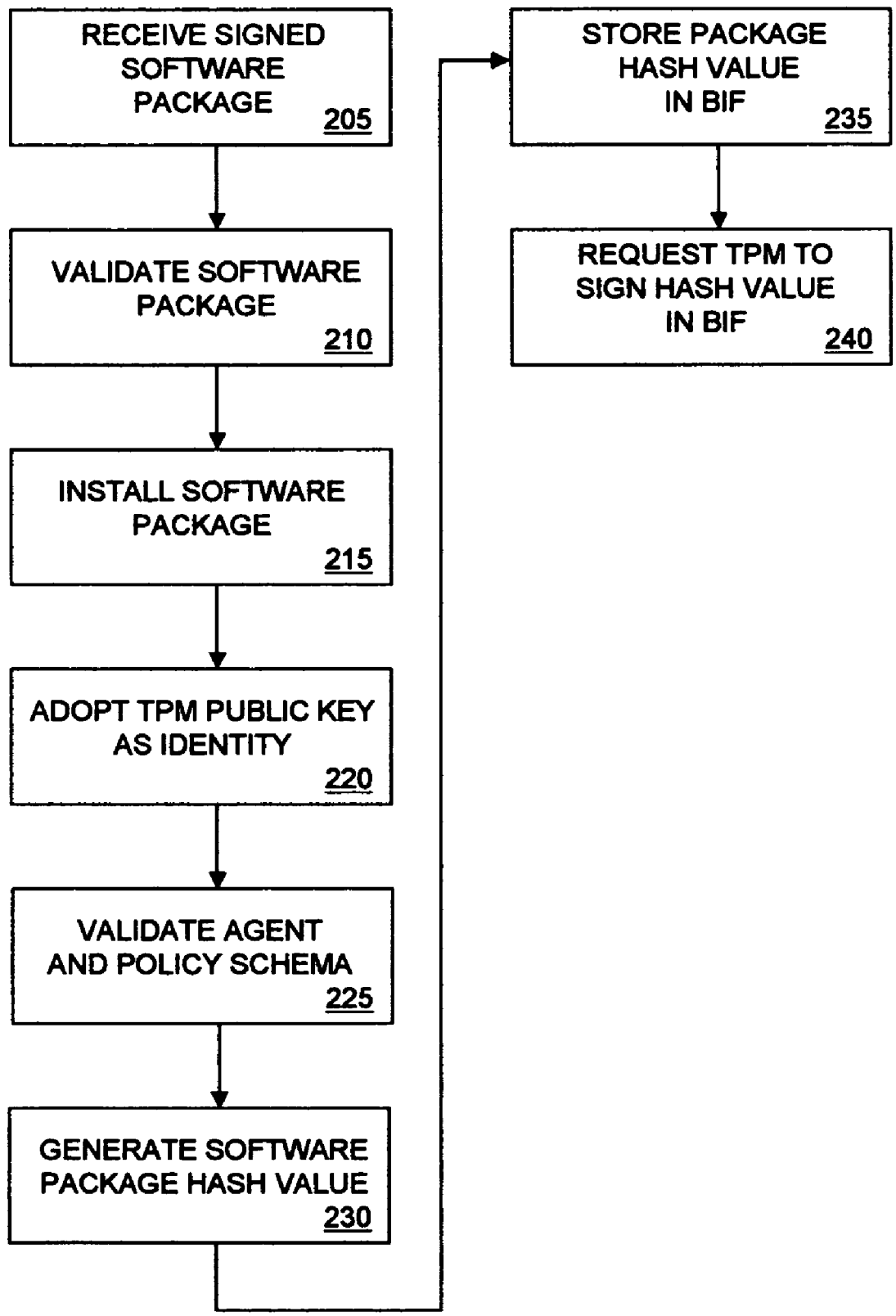
FIG. 2 is a flow diagram illustrating a secure method for installing a trustable community software package on a computer node in one embodiment of the invention.

Turning to FIG. 2, a secure method for installing the downloaded community software package on computer node 20 is shown in one embodiment of the invention. Operating system 240 receives the signed software package (205) and validates the entire software package using the public key of management console 110 (210). If validation is successful, operating system 240 completes installation of the software package (215) and the installed agent 210 retrieves and adopts the TPM public key as the identity of agent 210 (220). Agent 210 then validates agent 210 and policy schema 216 using the public key of management console 110 (225). If all of the validations are successful, agent 210 is installed as an unstoppable element of operating system 240. If any of the validations is unsuccessful, agent 210 self-terminates.

Once installed as an unstoppable element of operating system 240, agent 210 generates a new hash value of the entire software package (230). Agent 210 stores the new hash value in binding information file 214 (235) and requests TPM 220 to cryptographically sign the new hash value using the TPM private key (240). TPM 220 signs the new hash value as requested. It will be appreciated that the TPM-signed new hash value may be used to detect subsequent alteration or corruption of agent 210 or policy schema 216, whether by malware or otherwise.

As circumstances warrant, it may be desirable to replace installed policy schema 216 with a new policy schema. In that event, an administrator uses management console 110 to generate a new policy schema appropriate for community 230. Management console 110 generates a hash value of the new policy schema and cryptographically signs the schema hash value using the management console private key. In some embodiments, the new policy schema is also cryptographically signed by the administrator who defined the new policy schema using the administrator private key. Once all of the signatures have been applied, management console 110 downloads the new policy schema to computer node 20.

Figure 3:
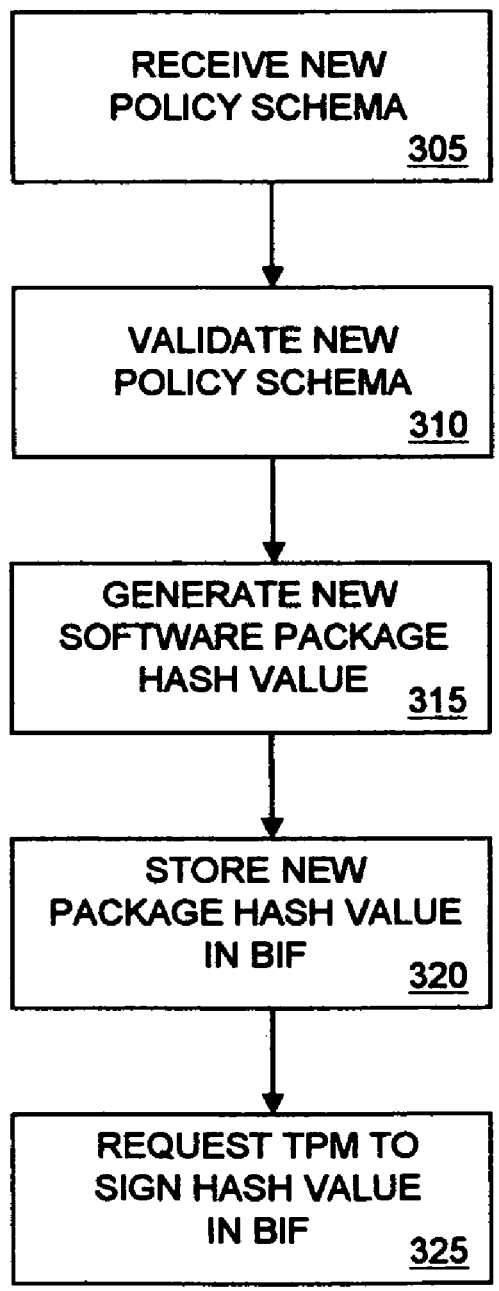
FIG. 3 is a flow diagram illustrating a secure method for installing a new policy schema for a trustable community on a computer node in one embodiment of the invention.

Turning now to FIG. 3, a flow diagram illustrates a secure method for installing a new policy schema on computer node 20 in one embodiment of the invention. Agent 210 receives the signed new policy schema (305) and validates the new policy schema source using the public key of the management console 110 (310). If validation is successful, agent 210 completes installation of the new policy schema and generates a new hash value of the entire software package, for example, agent 210 and the new policy schema (315). Agent 210 stores the new hash value in binding information file 214 (320) and requests TPM 220 to cryptographically sign the new hash value using the TPM private key (325). TPM 220 signs the new hash value as requested.

As circumstances warrant, it may be desirable to uninstall the installed community software package. In that event, management console 110, under direction of the administrator, prepares a community uninstall software package. Management console 110 maintains a master copy of the uninstall software package. Management console 110 generates a hash value of the uninstall software package and cryptographically signs the hash value using the management console private key. In some embodiments, the uninstall software package is also cryptographically signed by the administrator using the administrator private key. Once all of the signatures have been applied, management console 110 downloads the signed uninstall software package to computer node 20.

Figure 4:
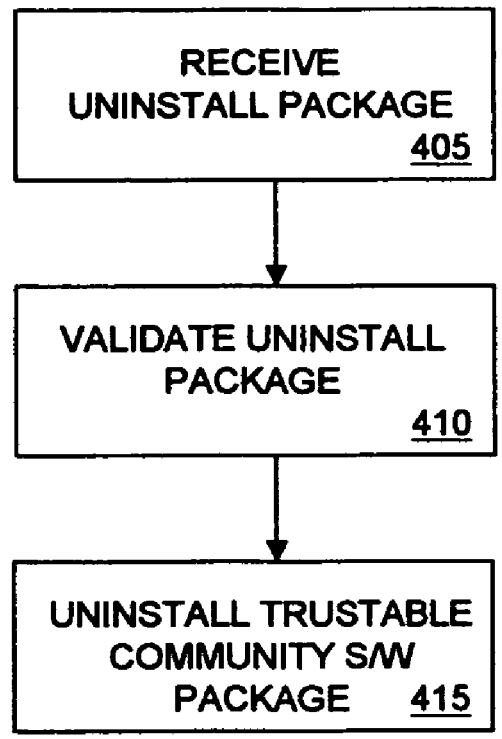
FIG. 4 is a flow diagram illustrating a secure method for uninstalling a trustable community software package on a computer node in one embodiment of the invention.

Turning now to FIG. 4, a flow diagram illustrates a secure method for deinstallation of a trusted enclave software package on computer node 20 in one embodiment of the invention. Agent 210 receives the signed uninstall software package (405) and validates the uninstall software package using the public key of management console 110 (410). If validation is successful, agent 210 permits deinstallation of the community software package including, for example, agent 210 and policy schema 216 (415). Any software components spawned by agent 210 during installation or operation, such as log file 212 and binding information file 214, may also be uninstalled. In some embodiments, community software package and spawned software components are removed from computer node 20 attendant to deinstallation. No action other than receipt of a valid uninstall software package will prompt agent 210 to permit deinstallation.

During its tenure as an unstoppable element of operating system 240, trustable community agent 210 performs two primary roles: (1) attempting to stop malware from compromising community 230 by conditioning operation of software components within community resources 218 upon a determination of present trustworthiness of software components within community resources 218 and (2) reporting breaches of the integrity of community 230 and actions relating to preventing execution and terminating of software components within community resources 218. To perform these dual roles, trusted community agent 210 cooperatively interfaces with other management components within community 230 including binding information file 214, policy schema 216 and TPM 220. Agent 210 also interfaces with log consolidation node 30.

One way in which agent 210 fulfills its first primary role is by conditioning operation of a software component within community resources 218 upon a determination of present trustworthiness of another software component within community resources 218. In some embodiments, a present trustworthiness determination involves finding a match between a present hash value and an earlier hash value of the other software component that has been cryptographically signed, and further involves applying community rules from policy schema 216 that define conditions under which the other software component is trustworthy or untrustworthy.

Figure 5:
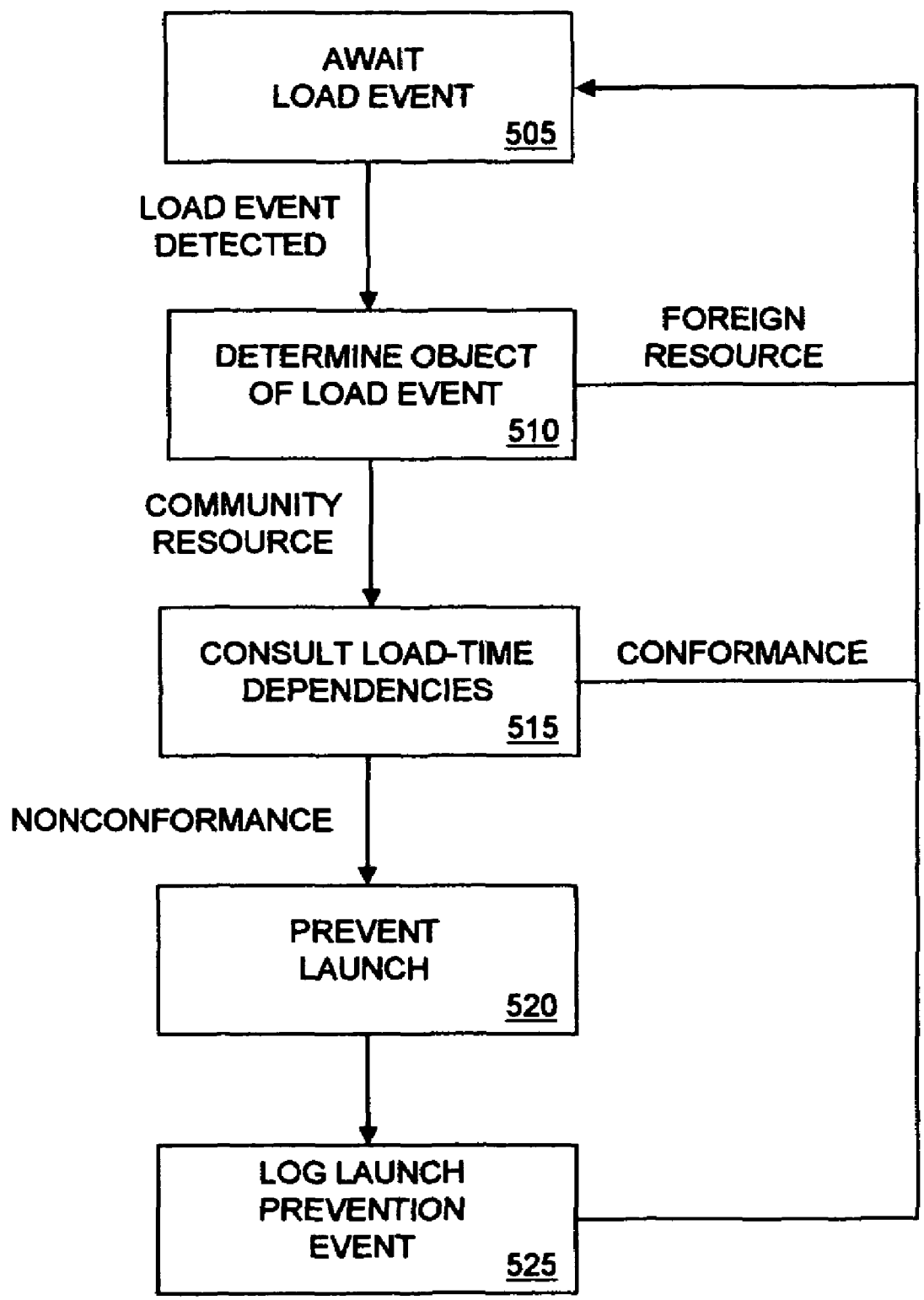
FIG. 5 is a flow diagram illustrating a method for performing a load-time trustworthiness determination in one embodiment of the invention.

Turning now to FIG. 5, a flow diagram illustrates a method for performing a trustworthiness determination at load-time in one embodiment of the invention. Initially, agent 210 listens for a software component load event (505). When a software component is loaded by operating system 240 in preparation for execution, agent 210 intercepts the load operation. Agent 210 learns the complete file or directory path to the loaded software component and consults policy schema 216 to determine whether the path elements match a community resource definition (510). If the path elements do not match a community resource definition, the loaded software component is within foreign resources 250 and is allowed to launch. If the path elements match a community resource definition, the loaded software component is within community resources 218 and agent 210 consults policy schema 216 to determine the load-time security dependencies for the loaded software component and whether there is conformance with such dependencies (515). If there is conformance with all load-time security dependencies, the loaded software component is allowed to launch. If there is nonconformance with any load-time security dependency, agent 210 prevents the software component from launching (520) and stores information about the launch prevention in log file 212 (525).

In some embodiments, load-time security dependencies include one or more of a hash check of the loaded software component; a hash check of one or more other software components within community 230; and application of community rules defining conditions under which one or more other software components within community 230 are trustworthy or not. The hash checks employ earlier calculated hash values of software components that have been cryptographically signed by TPM 220 and stored in binding information file 214 or policy schema 216. Agent 210 validates the stored hash values using the TPM public key and compares the stored hash values with respective hash values presently calculated from the software components to determine whether the integrity of any of the software components has been violated. If the integrity of any of the software components has been violated, agent 210 blocks the loaded software component from launching and logs information respecting the launch prevention in log file 212. If the integrity of the software components has not been violated, agent 210 proceeds to apply community rules to determine whether any of the one or more other software components is untrustworthy. If all of these software components are determined to be trustworthy, the loaded software component is allowed to launch. If any of these software components is determined to be untrustworthy, agent 210 blocks the loaded software component from launching and logs information respecting the denial in log file 212.

In some embodiments, community rules specify trustworthy or untrustworthy states for software components with which the loaded software component has security interdependence. Untrustworthy states may include, for example, a state where the software component does not presently exist, a state where the software component is not presently loaded or a state where the software component is not presently running. Agent 210 detects the states of software components within community resources 218 and applies the community rules to the detected states to make trustworthiness determinations.

By way of example, community 230 may have a spreadsheet application, a script file run by the spreadsheet application, a communication application and a firewall application within community resources 218. A community rule in policy schema 216 may specify that the communication application may only launch if the firewall application is running. The spreadsheet application loads and runs the script file to perform financial calculations. The script file then loads the communication application in preparation for making a connection to a virtual private network. Agent 210 intercepts the loading of the communication application and applies the community rule that the communication application may only launch if the firewall application is running. Agent 210 detects whether the firewall application is running by reference to the firewall application's runtime announcements of a unique identifier assigned by operating system 240. If the firewall application is running, the communication application is allowed to launch. If the firewall application is not running, agent 210 prevents the communication application from launching and logs information respecting the launch prevention in log file 212.

Figure 6:
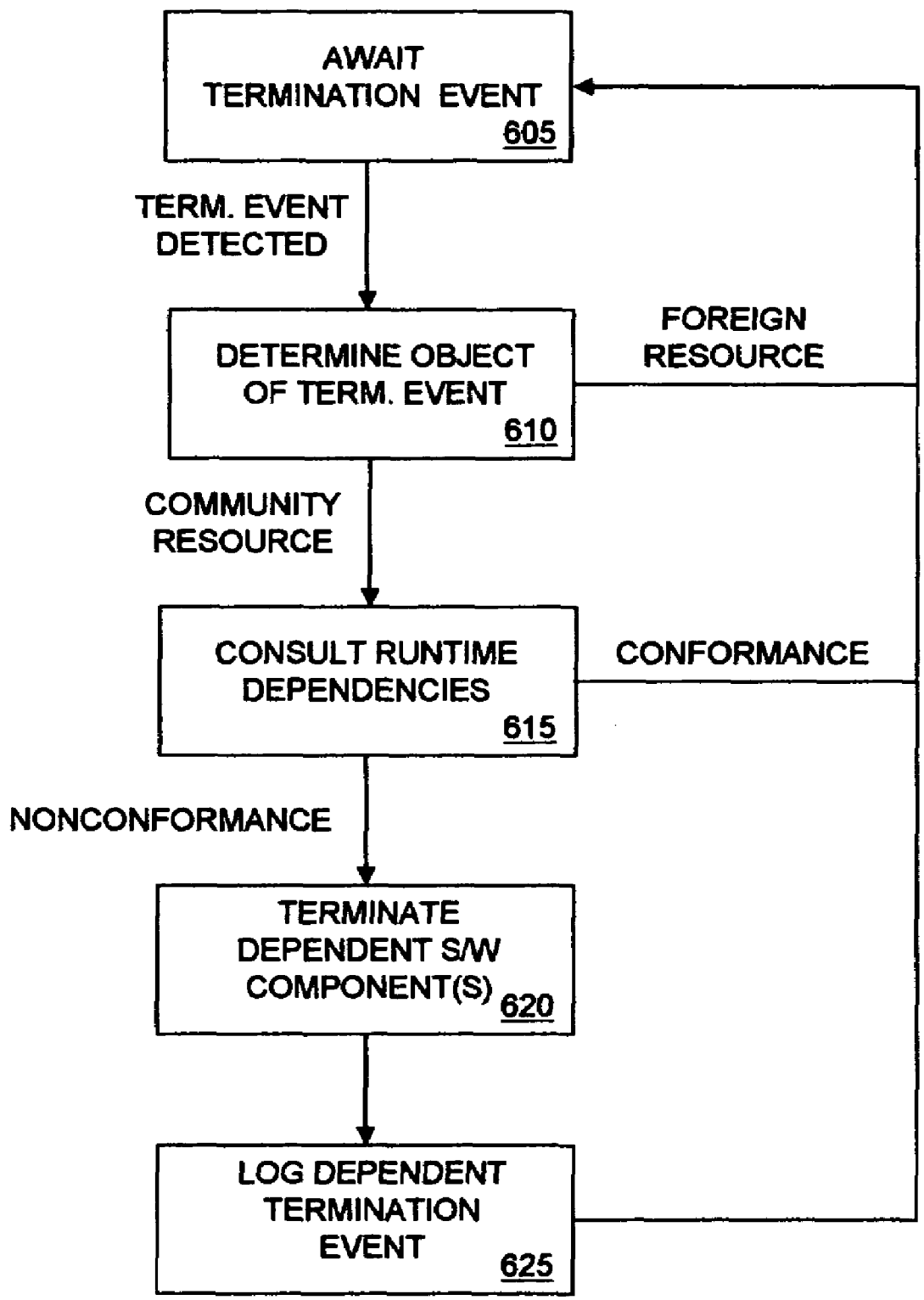
FIG. 6 is a flow diagram illustrating a method for performing a runtime trustworthiness determination in one embodiment of the invention.

Turning now to FIG. 6, a flow diagram illustrates a method for performing a trustworthiness determination at runtime in one embodiment of the invention. Initially, agent 210 listens for a software component termination event (605). When a software component terminates, agent 210 intercepts the termination operation. Agent 210 learns the complete file or directory path to the terminated software component and consults policy schema 216 to determine whether the path elements match a community resource definition (610). If the path elements do not match a community resource definition, the terminated component is within foreign resources 250 and no further action is required. If the path elements match a community resource definition, the terminated component is within community resources 218 and agent 210 consults policy schema 216 to determine the runtime security dependencies and whether there is conformance with such dependencies (615). If there is conformance with all runtime security dependencies, no further action is required. If there is nonconformance with any runtime security dependency, agent 210 terminates one or more dependent software components (620) and stores information about the dependent termination in log file 212 (625).

In some embodiments, runtime security dependencies include application of community rules defining conditions under which running software components within community resources 218 must be terminated as a result of termination of another software component within community resources 218. In these embodiments, the terminated software component is rendered untrustworthy by virtue of its termination. For example, a community rule in policy schema 216 may specify that a communication application must terminate if a firewall application terminates due to a security dependency of the communication application on the firewall application. If a running software component must be terminated, agent 210 forces termination of the software component and logs information respecting the termination in log file 212.

In some embodiments, a trustable community may be distributed across multiple computer nodes in a network. In these embodiments, a trustable community agent may proactively monitor a remote software component within the community and resident on a remote node and condition operation of a local software component within the community and resident on a local node on a determination of present trustworthiness of the remote software component. For example, a Web services client on a local node may subscribe to a Web service on a remote node. A community agent on the local node may proactively monitor the Web service and prevent launch of or terminate the Web services client upon detecting that the Web service has been rendered inoperative or compromised.

In other embodiments, intercommunity security dependencies may be established between multiple trustable communities. In these intercommunity embodiments, a trustable community agent may proactively monitor a first trustable community and a second trustable community and condition operation of the first trustable community on a determination of present trustworthiness of the second trustable community. In some embodiments, intercommunity security dependencies include hash checks of all or substantially all software components within the second community or application of intercommunity rules defining conditions under which the second community is trustworthy, for example. If the second community is deemed presently untrustworthy, launch of any software component within the first community may be prevented or termination of all software components within the second community may be forced, for example.

Trustable community agent 210 fulfills its second primary role by logging signature validation failures, hash check failures, launch preventions and software component terminations; and by regularly verifying the integrity of the community software package.

With regard to logging of failures, preventions and terminations, whenever agent 210 is unable to validate any signature or hash value during installation or operation, or prevents a software component launch, or forces termination of a software component, agent 210 logs information respecting the failure, prevention or termination in log file 212. Additionally, in some embodiments, agent 210 logs detected changes in operational status of community resources 218, such as changes between loaded, running and terminated status. After updating log file 212, agent 210 generates a new hash value of log file 212 and requests TPM 220 to cryptographically sign the new hash value using the TPM private key, after which TPM 220 signs the new hash value as requested. It will be appreciated that the TPM-signed hash value may be used to detect any subsequent alteration or corruption of log file 212, whether by malware or otherwise.

With regard to regularly verifying the integrity of the community software package, agent 210 invokes TPM 220 to sign the software package hash value stored in binding information file 214 in response to community software package installation and policy schema updates. In some embodiments, agent 210 thereafter periodically checks the signed software package hash value stored in binding information file 214 using the TPM public key to verify the integrity of the installed software package. Moreover, in some embodiments, the contents of log file 212 and binding information file 214 are periodically uploaded to log consolidation node 30 for auditing. Agent 210 retrieves the log information and the signed hash value stored in log file 212, and the signed software package hash value stored in binding information file 214, appends the TPM public key that agent 210 has adopted as its identity and uploads the log package and software package hash value to log consolidation node 30. Log consolidation node 30 validates the log package and the software package hash value using the TPM public key.

In some embodiments, the contents of log file 212 and binding information file 214 are extracted by log consolidation node 30 without intervention of agent 210 under certain circumstances, such as when agent 210 has been rendered inoperative due to alteration, corruption or deinstallation. Moreover, in some embodiments, the contents of binding information file 214 are periodically uploaded to management node 10 instead of log consolidation node 30 for auditing.

In some embodiments, Secure Hashing Algorithm (SHA-1) is invoked as the hash algorithm in the generation and validation of hash values described herein whereas RSA-1024 with PKCS#1.5 padding is invoked as the encryption algorithm in the generation and validation of signatures described herein.

In some embodiments, validation is performed as follows. A signed hash value of a software component is decrypted using the public key of the source of the signature to regenerate a plain text hash value. A hash value is separately generated from the software component. If the regenerated hash value matches the generated hash value then the software component is considered validated. Otherwise, validation is considered to have failed.

In some embodiments, downloads and uploads described herein are accomplished using one of email, network file transfer or direct network connectivity. In some embodiments, policy schema 216 is represented in signed eXtensible Markup Language (XML).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A computer node, comprising:
   a network interface;
   a processor communicatively coupled with the network interface and having an operating system executing thereon; and
   a hardware element communicatively coupled with the processor, wherein the hardware element is not managed by the operating system, wherein the computer node receives one or more managing software elements and one or more security dependencies for managed software elements via the network interface and installs the managing software elements on the computer node under management of the operating system, and wherein the computer node executes the managing software elements under management of the operating system whereby operation of managed software elements is conditioned on determinations of trustworthiness of other managed software elements made using the security dependencies, findings of untrustworthiness are logged in a log file maintained on the computer node, and integrity of the managing software elements, the security dependencies and the log file are verified at least in part by validating one or more hash values cryptographically signed by the hardware element.

2. The computer node of claim 1, wherein launch of a first managed software element is prevented on finding nonconformance of a second managed software element with a load-time security dependency for the first managed software element.

3. The computer node of claim 1, wherein operation of a first managed software element is terminated on finding nonconformance of a second managed software element with a runtime security dependency for the first managed software element.

4. The computer node of claim 1, wherein operation of a first managed software element is conditioned on validation of a hash value of a second managed software element.

5. The computer node of claim 1, wherein operation of a first managed software element is conditioned on an operational state of a second managed software element.

6. The computer node of claim 1, wherein operation of a first managed software element on the computer node is conditioned on a determination of trustworthiness of a second managed software element on a second computer node made using one or more security dependencies.

7. The computer node of claim 1, wherein operation of a first managed software element is conditioned on a determination of trustworthiness of a second managed software element made using one or more security dependencies, and wherein operation of a first community of software elements including the first managed software element and the second managed software element is conditioned on a determination of trustworthiness of a second community of software elements made using one or more security dependencies.

8. The computer node of claim 1, wherein upon updating the log file a hash value of the updated log file is cryptographically signed by the hardware element.

9. The computer node of claim 1, wherein upon updating a managing software element a hash value of the managing software element is cryptographically signed by the hardware element.

10. A method for maintaining trustable communities, comprising the steps of:
    receiving on a computer node one or more managing software elements and security dependencies for managed software elements;
    installing on the computer node, under management of an operating system executing on the computer node, the managing software elements;
    conditioning by the computer node, under management of the operating system, operation of managed software elements on determinations of trustworthiness of other managed software elements made using the security dependencies;
    logging by the computer node in a log file maintained on the computer node, under management of the operating system, findings of untrustworthiness; and
    verifying by the computer node, under management of the operating system, integrity of the managing software elements, the security dependencies and the log file at least in part by validating one or more hash values cryptographically signed by a hardware element on the computer node, wherein the hardware element is not managed by the operating system.

11. The method of claim 10, wherein launch of a first managed software element is prevented on finding nonconformance of a second managed software element with a load-time security dependency for the first managed software element.

12. The method of claim 10, wherein operation of a first managed software element is terminated on finding nonconformance of a second managed software element with a runtime security dependency for the first managed software element.

13. The method of claim 10, wherein operation of a first managed software element is conditioned on validation of a hash value of a second managed software element.

14. The method of claim 10, wherein operation of a first managed software element is conditioned on operational state of a second managed software element.

15. The method of claim 10, wherein operation of a first managed software element on the computer node is conditioned on a determination of trustworthiness of a second managed software element on a second computer node made using one or more security dependencies.

16. The method of claim 10, wherein operation of a first managed software element is conditioned on a determination of trustworthiness of a second managed software element made using one or more security dependencies, and wherein operation of a first community of software elements including the first managed software element and the second managed software element is conditioned on a determination of trustworthiness of a second community of software elements made using one or more security dependencies.

17. The method of claim 10, further comprising the steps of updating by the computer node, under management of the operating system, the log file and cryptographically signing by the hardware element a hash value of the updated log file.

18. The method of claim 10, further comprising the steps of receiving on the computer node updated managing software elements and cryptographically signing by the hardware element a hash value of the updated managing software elements.

19. A management node, comprising:
a management console; and
a network interface, wherein under control of the management console the management node downloads via the network interface one or more managing software elements and one or more security dependencies for managed software elements to a computer node whereon the managing software elements are installed and executed under management of an operating system executing on the computer node whereby operation of managed software elements is conditioned on determinations of trustworthiness of other managed software elements made using the security dependencies, findings of untrustworthiness are logged in a log file maintained on the computer node and integrity of the managing software elements, the security dependencies and the log file are verified by validating one or more hash values cryptographically signed by a hardware element on the computer node that is not managed by the operating system.

20. The management node of claim 19, wherein launch of a first managed software element is prevented on finding nonconformance of a second managed software element with a load-time security dependency for the first managed software element.

21. The management node of claim 19, wherein operation of a first managed software element is terminated on finding nonconformance of a second managed software element with a runtime security dependency for the first managed software element.

22. The management node claim 19, wherein operation of a first managed software element is conditioned on validation of a hash value of a second managed software element.

23. The management node of claim 19, wherein operation of a first managed software element is conditioned on operational state of a second managed software element.

24. The management node of claim 19, wherein operation of a first managed software element on the computer node is conditioned on a determination of trustworthiness of a second managed software element on a second computer node made using one or more security dependencies.

25. The management node of claim 19, wherein operation of a first managed software element is conditioned on a determination of trustworthiness of a second managed software element made using one or more security dependencies, and wherein operation of a first community of software elements including the first managed software element and the second managed software element is conditioned on a determination of trustworthiness of a second community of software elements made using one or more security dependencies.

* * * * *